United States Patent
Ray et al.

(10) Patent No.: US 11,691,222 B2
(45) Date of Patent: Jul. 4, 2023

(54) THREE-DIMENSIONAL PRINTING SYSTEM WITH SELF-MAINTAINING POWDER DISTRIBUTION SUBSYSTEM

(71) Applicant: LAYERWISE NV, Leuven (BE)

(72) Inventors: Nachiketa Ray, Leuven (BE); Peter Geboes, Leuven (BE); Brawley Valkenborgs, Leuven (BE); Jan Plas, Wilsele (BE); Rudy Raeymaekers, Arendonk (BE)

(73) Assignee: LAYERWISE NV, Leuven (BE)

( * ) Notice: Subject to any disclaimer, the term of this patent is extended or adjusted under 35 U.S.C. 154(b) by 237 days.

(21) Appl. No.: 16/842,999

(22) Filed: Apr. 8, 2020

(65) Prior Publication Data
US 2020/0368849 A1    Nov. 26, 2020

(51) Int. Cl.
| | | |
|---|---|---|
| *B23K 26/342* | (2014.01) | |
| *B33Y 10/00* | (2015.01) | |
| *B33Y 30/00* | (2015.01) | |
| *B33Y 40/00* | (2020.01) | |
| *B33Y 50/02* | (2015.01) | |
| *B23K 26/082* | (2014.01) | |

(52) U.S. Cl.
CPC .......... *B23K 26/342* (2015.10); *B23K 26/082* (2015.10); *B33Y 10/00* (2014.12); *B33Y 30/00* (2014.12); *B33Y 40/00* (2014.12); *B33Y 50/02* (2014.12)

(58) Field of Classification Search
CPC ......... B33Y 10/00; B33Y 30/00; B33Y 40/00; B33Y 50/02; B23K 26/342; B23K 26/082; B29C 64/209; B29C 64/255; B29C 64/35; B29C 64/357; B29C 64/321; B29C 64/329; B22F 10/73; B22F 12/50; B22F 12/52
See application file for complete search history.

(56) References Cited

U.S. PATENT DOCUMENTS

| | | | |
|---|---|---|---|
| 7,047,098 B2* | 5/2006 | Lindemann | B22F 12/00 700/118 |
| 8,124,192 B2* | 2/2012 | Paasche | B22F 12/00 264/510 |
| 10,016,852 B2 | 7/2018 | Broda | |
| 10,195,693 B2 | 2/2019 | Buller et al. | |
| 2011/0223349 A1 | 9/2011 | Scott | |

(Continued)

OTHER PUBLICATIONS

EP Communication for European Application 20170276.8 dated May 12, 2022 (6 pages).

*Primary Examiner* — Michael P Wieczorek (57) ABSTRACT

A three-dimensional printing system for manufacturing a three-dimensional article includes a build chamber, an overflow chamber adjacent to the build chamber, a motorized build plate, a powder coater including a vibration generator, a lateral movement mechanism coupled to the powder coater, and a controller. The controller is configured to perform a process to remove accumulated powder from surfaces of the powder coater according to the steps: (1) operate the lateral movement mechanism to position the powder coater over a location outside of the build chamber; (2) operate the vibration generator to shake the accumulated powder into the location outside of the build chamber. The location outside of the build chamber can be defined by the overflow chamber.

18 Claims, 4 Drawing Sheets

(56) References Cited

U.S. PATENT DOCUMENTS

| | | | |
|---|---|---|---|
| 2015/0231798 A1* | 8/2015 | Goto | B29C 64/35 |
| | | | 428/206 |
| 2015/0258733 A1 | 9/2015 | Okamoto et al. | |
| 2017/0120538 A1 | 5/2017 | DeMuth et al. | |
| 2017/0326806 A1 | 5/2017 | DeMuth et al. | |
| 2022/0111553 A1* | 4/2022 | Kitani | B33Y 10/00 |

* cited by examiner

THREE-DIMENSIONAL PRINTING SYSTEM WITH SELF-MAINTAINING POWDER DISTRIBUTION SUBSYSTEM

CROSS REFERENCE TO RELATED APPLICATION

This non-provisional patent application claims priority to European Patent Application Number EP 19175380, Entitled "THREE-DIMENSIONAL PRINTING SYSTEM WITH SELF-MAINTAINING POWDER DISTRIBUTION SUBSYSTEM" by Nachiketa Ray et al., filed on May 20, 2019, incorporated herein by reference under the benefit of U.S.C. 119(e).

FIELD OF THE INVENTION

The present disclosure concerns an apparatus and method for the fabrication of three dimensional (3D) articles utilizing powder materials. More particularly, the present disclosure concerns an apparatus and method for maintaining proper operation of a powder dispensing and metering system.

BACKGROUND

Three dimensional (3D) printing systems are in rapidly increasing use for purposes such as prototyping and manufacturing. One type of three dimensional printer utilizes a layer-by-layer process to form a three dimensional article of manufacture from powdered materials. Each layer of powdered material is selectively fused using an energy beam such as a laser, electron, or particle beam. One challenge in operating a system is maintaining uniformity and quality of the dispensed layers of powder.

SUMMARY

In a first aspect of the disclosure, a three-dimensional printing system for manufacturing a three-dimensional article includes a build chamber, an overflow chamber adjacent to the build chamber, a motorized build plate, a powder coater including a vibration generator, a lateral movement mechanism coupled to the powder coater, and a controller. The controller is configured to perform a process to remove accumulated powder from surfaces of the powder coater according to the steps: (1) operate the lateral movement mechanism to position the powder coater over a location that is laterally outside of the build chamber; (2) operate the vibration generator to shake the accumulated powder from the powder coater and onto the location that is laterally outside of the build chamber. The location that is laterally outside of the build chamber can be over the overflow chamber.

In one implementation, the three-dimensional printing system further includes a hopper and a beam system. The controller is configured to accrete a layer of selectively fused powder over an upper surface according to the steps: (1) position the motorized build plate with the upper surface proximate to a build plane to receive another layer of powder; (2a) scan the powder coater over the upper surface; (2b) concurrent with scanning, meter a layer of unfused powder onto the upper surface; (3) operate the beam system to selectively fuse the metered layer. The upper surface as defined is either the upper surface of the build plate (for selectively fusing the first layer of powder) or the upper surface of the latest dispensed layer of powder. The controller can be configured to accrete at least two layers of selectively fused powder between performing the accumulated powder removal process. The controller can be configured to accrete at least four, at least eight, at least 16, at least 32, or more layers of selectively fused powder between performing the accumulated powder removal process. The hopper can be located above the overflow chamber.

In another implementation the powder coater is configured to scan along a scan axis X. The powder coater has a major axis along a transverse axis Y that is normal to the scan axis X. The vibration generator is positioned or located proximate to one end of the powder coater with respect to the transverse axis Y. The vibration generator can be motor coupled to an eccentric weight. The motor axis can be aligned with the scan axis.

In yet another implementation, the vibration generator can include a transducer such as a piezoelectric device and/or an ultrasonic transducer.

In a second aspect of the disclosure, a method of manufacturing a three-dimensional article includes the steps: (A) Accreting a layer of selectively fused powder onto an upper surface. The upper surface is one of an upper surface of a build plate and an upper surface of a powder layer. Accreting includes the steps of (1) positioning the upper surface proximate to a build plane; (2a) scanning a powder coater over the upper surface along a scan axis; (2b) concurrent with scanning, metering a layer of unfused powder onto the upper surface; (3) operating a beam system to selectively fuse the metered layer of powder. (B) Repeat accreting layers of powder above the build plate. (C) After accreting N layers, in which N is at least one, remove accumulated powder residue from surfaces of the powder coater according to the steps of (1) positioning the powder coater over a location that is laterally outside of the build plane; (2) operating a vibration generator to shake the accumulated powder onto the location outside of the build plane. N can be at least two, at least four, at least eight, at least 16, at least 32, or a higher number depending upon a rate of accumulation of powder upon the powder coater.

In one implementation the vibration generator is a motor coupled to an eccentric weight. Operating the vibration generator includes spinning the eccentric weight along an axis that is parallel to the scan axis.

In a third aspect of the disclosure, a three-dimensional printing system for manufacturing a three-dimensional article includes a build chamber, an overflow chamber adjacent to the build chamber, a motorized build plate, a powder coater including a vibration generator, a powder hopper, a lateral movement mechanism, a beam system, and a controller. The controller is configured to: (1) position an upper surface proximate to a build plane; the upper surface is one of an upper surface of a build plate and an upper surface of a previously deposited powder layer; (2) operate the lateral movement mechanism to scan the powder coater over the build plane; (3) concurrent with scanning, operate the powder coater to meter a layer of unfused powder onto the upper surface; (4) operate the beam system to selectively fuse the metered layer of powder; (5) repeat (1)-(4) until the three-dimensional article is fabricated; (6) replenish the powder coater with powder using the powder hopper after metering and/or selectively fusing M layers, M is at least one; (7) move the powder coater to the overflow chamber and operate the vibration generator after metering and/or selectively fusing N layers, N is at least two. M can equal two. N can be a positive nonzero integer multiple of M. N can equal at least four, at least eight, at least 16, or a larger positive integer value.

DETAILED DESCRIPTION OF THE PREFERRED EMBODIMENTS

Figure 1:
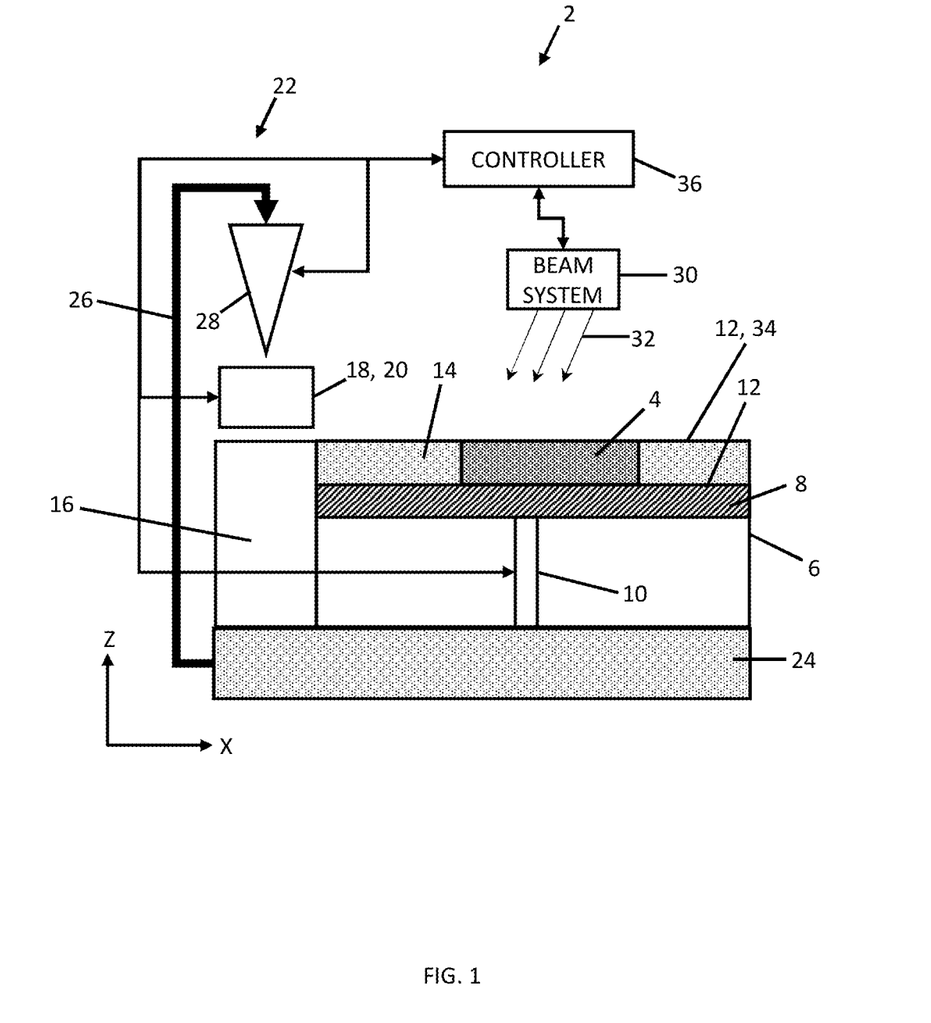
FIG. 1 is a side view schematic of an embodiment of a three-dimensional printing system for fabricating a three-dimensional article.

FIG. 1 is a side view schematic diagram of an embodiment of a three-dimensional printing system 2 for fabricating a three-dimensional article 4. In describing system 2, mutually orthogonal axes X, Y, and Z can be used. Axes X and Y are lateral axes and generally horizontal. Axis Z is a vertical axis that is generally aligned with a gravitational reference. By "generally" we mean that a measure such as a quantity, a dimensional comparison, or an orientation comparison is by design and within manufacturing tolerances but as such may not be exact. The axis X can be referred to as a scan axis. The axis Y can be referred to as a transverse axis.

System 2 includes a build chamber 6 containing a motorized build plate 8. The motorized build plate 8 includes a vertical positioning mechanism 10 for adjusting a position of an upper surface 12. In referring to upper surface 12, it is either an upper surface 12 of build plate 8 or of a previously dispensed layer of powder 14.

An overflow chamber 16 is positioned adjacent to the build chamber 6. While illustrated on one side of build chamber 6, the overflow chamber 16 can include more than one chamber and can be present on two, three, or all four sides of the build chamber 6.

A powder coater 18 includes a lateral movement mechanism 20. The lateral movement mechanism is configured to scan the powder coater along the scan axis X. Concurrent with the scanning, the powder coater 18 is configured to meter a layer of powder onto the upper surface 12. The powder coater 18 typically will hold enough powder to provide one or two layers of powder 14. Thus, powder coater 18 needs to be resupplied periodically.

A powder supply subsystem 22 is for supplying powder to the powder coater 18 to "recharge" the powder coater 18 with powder 14. The powder supply subsystem includes powder reservoir 24, powder transport 26, and a hopper 28. The powder transport 26 can include a system of auger conveyors that rotate and transport powder from the powder reservoir 24 to the hopper 28. The hopper 28 is configured to dispense a quantity of powder 14 into the powder coater 18. In the illustrated embodiment, the powder hopper 28 is disposed above the overflow chamber 16.

When a new layer of powder 14 has been metered onto the upper surface 12, a beam system 30 is configured to selectively fuse the powder layer to accrete a layer onto the article 4. The beam system 30 generates an energy beam that can include one or more of a radiation beam, an electron beam, or a particle beam.

In an illustrative embodiment, the beam system 30 generates and scans a plurality of laser radiation beams 32 that scan across a build plane 34. The build plane 34 defines a location of the new layer of powder to be selectively fused.

In an illustrative embodiment, the powder 14 is a metal powder such as titanium alloy, steel, Ni alloy, Co alloy or an aluminum alloy. In other embodiments, the powder 14 is a polymer powder.

For metal powders, a high power laser for melting and fusing the powder typically outputs a radiative power of at least 50 watts. In various embodiments, the laser can output power of 500 watts or 1000 watts. For systems employing polymer powders, the power level can be considerably lower.

A controller 36 is coupled to and configured to operate the vertical positioning mechanism 10, the powder coater 18, the lateral movement mechanism 20, the powder supply subsystem 22, and the beam system 30. The controller 36 includes a processor coupled to a computer-readable storage apparatus. The computer-readable storage apparatus includes a non-transitory or non-volatile storage medium that stores software instructions. When executed by the processor, the software instructions operate various portions of system 2.

Figure 2:
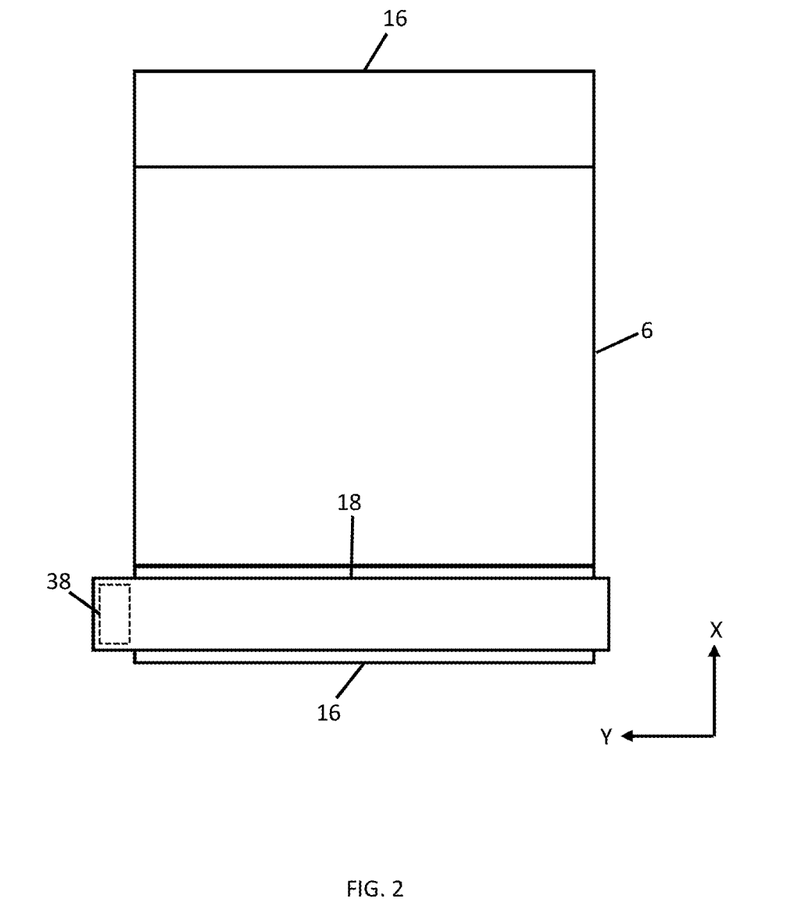
FIG. 2 is a plan view schematic diagram of some portions of an embodiment of a three-dimensional printing system including a build chamber, two overflow chambers, and a powder coater. The powder coater includes a vibration generator.

FIG. 2 is a plan view schematic diagram of some portions of an embodiment of system 2 including the build chamber 6, two overflow chambers 16, and the powder coater 18. The two overflow chambers 16 are at opposing ends of build chamber 16 with respect to scan axis X. The powder coater 18 is shown positioned above one of the overflow chambers 16. During operation of system 2, powder will tend to accumulate on surfaces of the powder coater 18. The accumulated powder will sometimes randomly fall from the powder coater 18. If this happens while a layer of powder is being metered, the result can be a defect in the metered layer.

To eliminate this problem, a vibration generator 38 is integrated into the powder coater 18. The concern with the accumulated powder can be resolved by positioning the powder coater 18 over a location outside of the build chamber and then operating the vibration generator 38 to shake off the powder at this location. In the illustrated embodiment, the powder coater 18 is positioned over the overflow chamber 16 before operating the vibration generator 38. The vibrations cause the powder to fall into the overflow chamber 16.

In the illustrated embodiment, the front of the machine is to the right (in a direction of -Y). The vibration generator 38 is located toward a rearward side of the powder coater 18. The scan axis X, as viewed from the front of the machine, is from left to right and/or right to left.

Figure 3:
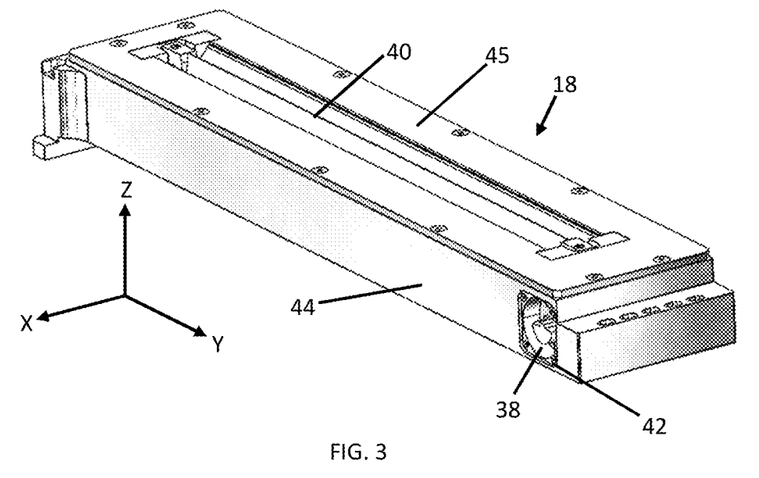
FIG. 3 is an isometric drawing of an embodiment of a powder coater.

FIG. 3 is an isometric drawing of an embodiment of the powder coater 18. Powder coater 18 has a major axis that is parallel to the transverse axis Y, an intermediate axis that is parallel to the scan axis X, and a minor axis that is parallel to vertical axis Z. An inlet slot 40 is disposed along the transverse axis Y for receiving powder dispensed from hopper 28 when the powder coater is recharged with powder 14. The vibration generator 38 is inside an opening 42 in the powder coater 18 which is positioned proximate to one end of the powder coater 18 with respect to the transverse axis Y. A cover (not shown) would be positioned over the opening 42 when the powder coater 18 is in use.

Figure 3A:
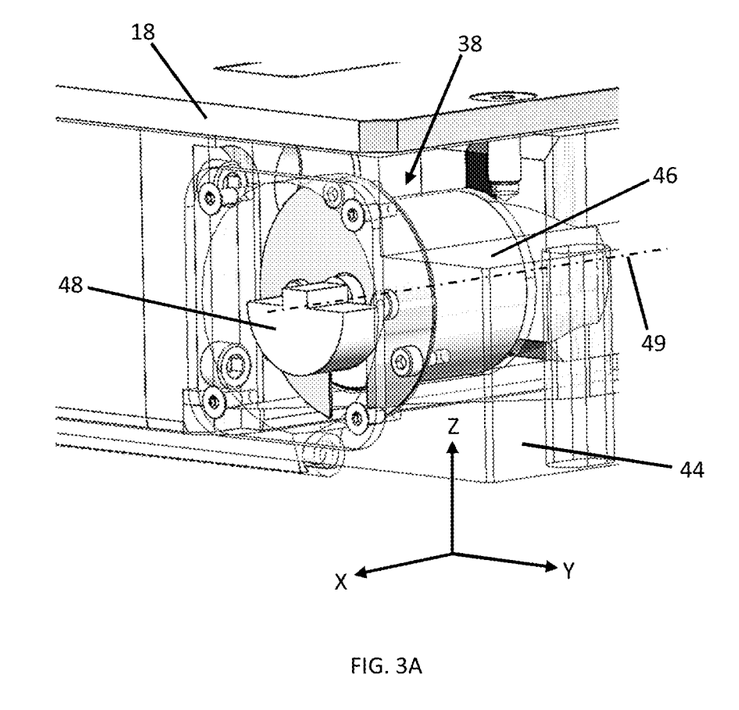
FIG. 3A is detail taken from FIG. 3 with portions of an outer housing shown transparently.

FIG. 3A is detail taken from FIG. 3 with portions of an outer housing 44 of the powder coater shown transparently.

In the illustrated embodiment, the vibration generator 38 includes a motor 46 coupled to a semicircular eccentric weight 48. The motor 46 has a rotational axis 49 that is parallel to the scan axis X. This version of the vibration generator 38 can be referred to as a vibration motor 38.

In an illustrative embodiment, the vibration motor 38 can operate with an input voltage range of about 2 to 14 volts. Within this input voltage range, the rotational frequency varies from about 20 Hertz to about 130 Hertz. Other vibration motors 38 can be used and this is but one example. Other motors may operate with different input voltages and/or with different frequency ranges and still be useful for this application. Yet other vibration generators 38 can be used such as piezoelectric and/or ultrasonic transducers.

Figure 4:
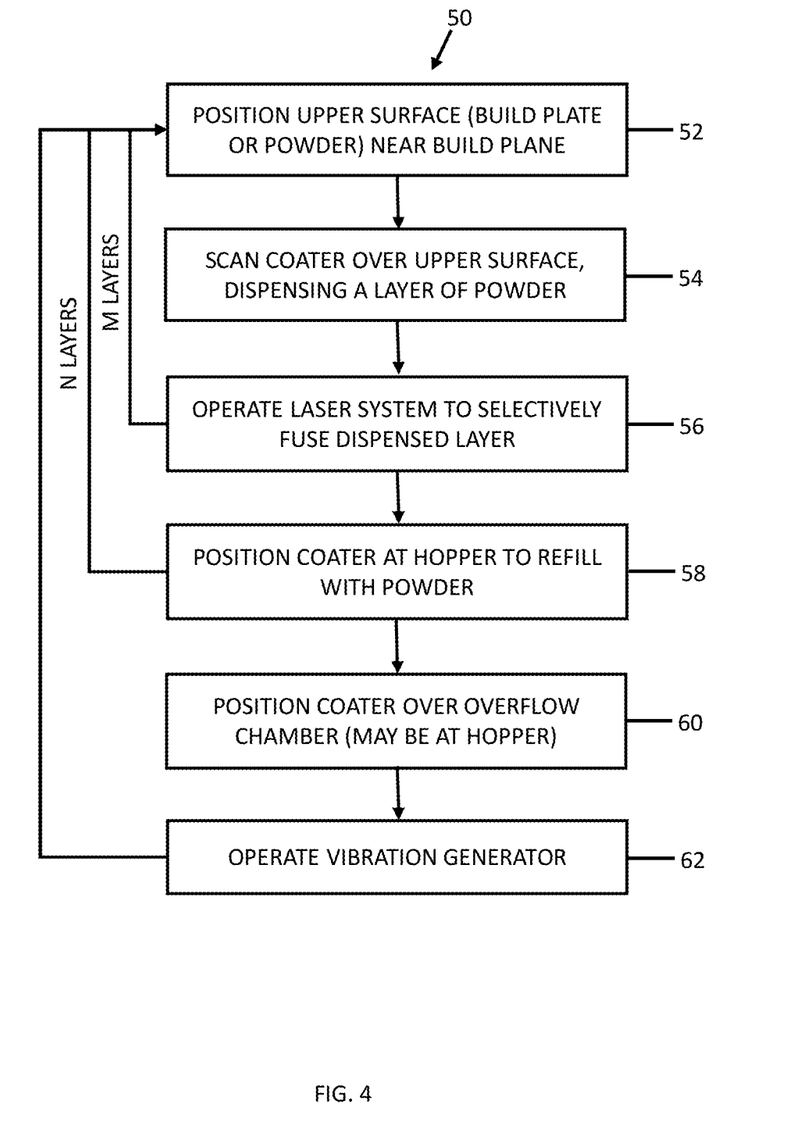
FIG. 4 is a flowchart depicting an embodiment of a method of manufacturing a three-dimensional article.

FIG. 4 is a flowchart depicting an embodiment of a method 50 of manufacturing a three-dimensional article 4 using the three-dimensional printing system 2. Method 50 is illustrative of the execution of software steps by a processor within the controller 36. The actual number of software steps may be much greater than the illustrated flowchart however.

Steps 52, 54, and 56 are steps for accreting a layer of selectively fused powder upon the upper surface 12. According to 52, the motorized build plate is operated to position the upper surface 12 proximate to the build plane 34. According to 54, the powder coater 18 is scanned above the build plane 34 along the scan axis X. Concurrent with scanning, the powder coater 18 is operated to meter a layer of powder 14 upon the upper surface 12. According to 56, the beam system 30 is operated to selectively fuse the metered layer of powder 14. As indicated by the upper loop, steps 52-56 can be repeated M times based upon a capacity of powder coater 18. In an illustrative embodiment, M=2.

According to 58, the powder coater 18 is positioned under the hopper 28. Hopper 28 then dispenses powder 14 into the inlet slot 40 to recharge the powder coater 18. As indicated by the middle loop, steps 52-56 repeat for the accretion of N selectively fused layers of the article 4. Typically N is a multiple of M. In an illustrative embodiment, N=12, and the powder coater 18 is recharged six times during the accretion of four selectively fused layers. During formation of the 12 layers, powder may accumulate on an upper surface 45 (FIG. 3) of the powder coater.

According to 60, the powder coater 18 is positioned over the overflow chamber 16. In one illustrative embodiment, the hopper 28 is also above the overflow chamber 16. According to 62, the vibration generator 38 is operated to shake the accumulated powder from the powder coater 18 and into the overflow chamber 16. Then the process proceeds back to step 52 to be repeated for another N layers, and this process continues until fabrication of article 4 is complete.

Generally speaking, M can be one or more. N can equal M or be any non-zero positive integer multiple of M. Selection of M is based upon a capacity of the powder coater 18 and selection of N is based upon a rate of accumulation of powder upon the powder coater 18 outer surfaces.

The specific embodiments and applications thereof described above are for illustrative purposes only and do not preclude modifications and variations encompassed by the scope of the following claims.

Item 1. A three-dimensional printing system for manufacturing a three-dimensional article comprising:
a build chamber;
an overflow chamber adjacent to the build chamber;
a motorized build plate;
a powder coater including a vibration generator;
a lateral movement mechanism coupled to the powder coater; and
a controller configured to perform a process to remove accumulated powder from surfaces of the powder coater according to the steps:
  operate the lateral movement mechanism to position the powder coater over a location outside of the build chamber; and
  operate the vibration generator to shake the accumulated powder onto the location outside of the build chamber.

Item 2. The three-dimensional printing system of item 1 further comprising a hopper and a beam system, the controller is configured to accrete a layer of selectively fused powder over an upper surface according to the steps:
  position the motorized build plate with the upper surface proximate to a build plane to receive another layer of powder;
  scan the powder coater over the upper surface;
  concurrent with scanning, meter a layer of unfused powder onto the upper surface; and
  operate the beam system to selectively fuse the metered layer.

Item 3. The three-dimensional printing system of item 2 wherein the controller is configured to accrete at least two layers of selectively fused powder between performing the accumulated powder removal process.

Item 4. The three-dimensional printing system of item 2 wherein the controller is configured to accrete at least 10 layers of selectively fused powder between performing the accumulated powder removal process.

Item 5. The three-dimensional printing system of item 2 wherein the hopper is located above the overflow chamber.

Item 6. The three-dimensional printing system of item 1 wherein the powder coater is configured to scan along a scan axis and has a major axis along a transverse axis that is normal to the scan axis, the vibration generator is positioned proximate to one end of the powder coater with respect to the transverse axis.

Item 7. The three-dimensional printing system of item 6 wherein the vibration generator is a motor coupled to an eccentric weight, the motor axis is aligned with the scan axis.

Item 8. The three-dimensional printing system of item 1 wherein the vibration generator is a motor coupled to an eccentric weight, the motor axis is aligned with the scan axis.

Item 9. The three-dimensional printing system of item 1 wherein the location outside of the build chamber is defined by the overflow chamber.

Item 10. A method of manufacturing a three-dimensional article comprising:
accreting a layer of selectively fused powder onto an upper surface, the upper surface is one of an upper surface of a build plate and an upper surface of a powder layer, according to the steps of:
  positioning the upper surface proximate to a build plane;
  scanning a powder coater over the upper surface along a scan axis;
  concurrent with scanning, metering a layer of unfused powder onto the upper surface; and
  operating a beam system to selectively fuse the metered layer of powder;
repeat accreting layers of powder above the build plate; and
after accreting N layers, in which N is at least one, remove accumulated powder residue from surfaces of the powder coater according to the steps of:

positioning the powder coater over a location that is laterally outside of the build plane; and
operating a vibration generator to shake the accumulated powder onto the location outside of the build plane.

Item 11. The method of item 10, wherein N is at least 2.

Item 12. The method of item 10, wherein N is at least 10.

Item 13. The method of item 10, wherein the vibration generator is a motor coupled to an eccentric weight, operating the vibration generator includes spinning the eccentric weight along an axis that is parallel to the scan axis.

Item 14. The method of item 10, wherein the location outside of the build plane includes an overflow chamber.

Item 15. A three-dimensional printing system for manufacturing a three-dimensional article comprising:
a build chamber;
an overflow chamber adjacent to the build chamber;
a motorized build plate;
a powder coater including a vibration generator;
a powder hopper;
a lateral movement mechanism;
a beam system; and
a controller configured to:
  (1) position an upper surface proximate to a build plane, the upper surface is one of an upper surface of a build plate and an upper surface of a previously deposited powder layer;
  (2) operate the lateral movement mechanism to scan the powder coater over the build plane;
  (3) concurrent with scanning, operate the powder coater to meter a layer of unfused powder onto the upper surface;
  (4) operate the beam system to selectively fuse the metered layer of powder;
  (5) repeat (1)-(4) until the three-dimensional article is fabricated;
  (6) replenish the powder coater with powder using the powder hopper after selectively fusing M layers, M is at least one; and
  (7) move the powder coater to the overflow chamber and operate the vibration generator after selectively fusing N layers, N is at least two.

Item 16. The three-dimensional printing system of item 15 wherein M equals two.

Item 17. The three-dimensional printing system of item 15 wherein N is at least 10.

Item 18. The three-dimensional printing system of item 15 wherein the powder coater is configured to scan along a scan axis and has a major axis along a transverse axis that is normal to the scan axis, the vibration generator is positioned at one end of the power coater with respect to the transverse axis.

Item 19. The three-dimensional printing system of item 15 wherein the vibration generator is a motor coupled to an eccentric weight, the motor axis is aligned with the scan axis.

The invention claimed is:

1. A three-dimensional printing system for manufacturing a three-dimensional article comprising:
a build chamber;
an overflow chamber adjacent to the build chamber;
a motorized build plate;
a powder coater including a vibration generator;
a lateral movement mechanism coupled to the powder coater; and
a controller configured to perform a process to remove accumulated powder from surfaces of the powder coater according to the steps:
  operate the lateral movement mechanism to position the powder coater over a location outside of the build chamber; and
  operate the vibration generator to shake the accumulated powder from an upper outside surface of the powder coater onto the location outside of the build chamber.

2. The three-dimensional printing system of claim 1 further comprising a hopper and a beam system, the controller is configured to accrete a layer of selectively fused powder over an upper surface according to the steps:
  position the motorized build plate with the upper surface proximate to a build plane to receive another layer of powder;
  scan the powder coater over the upper surface;
  concurrent with scanning, meter a layer of unfused powder onto the upper surface; and
  operate the beam system to selectively fuse the metered layer.

3. The three-dimensional printing system of claim 2 wherein the controller is configured to accrete at least two layers of selectively fused powder between performing the accumulated powder removal process.

4. The three-dimensional printing system of claim 2 wherein the hopper is located above the overflow chamber.

5. The three-dimensional printing system of claim 2, wherein the controller is configured to accrete at least 10 layers of selectively fused powder between performing the accumulated powder removal process.

6. The three-dimensional printing system of claim 1 wherein the powder coater is configured to scan along a scan axis and has a major axis along a transverse axis that is normal to the scan axis, the vibration generator is positioned proximate to one end of the powder coater with respect to the transverse axis.

7. The three-dimensional printing system of claim 1 wherein the vibration generator is a motor coupled to an eccentric weight, the motor axis is aligned with the scan axis.

8. The three-dimensional printing system of claim 1 wherein the location outside of the build chamber is defined by the overflow chamber.

9. A method of manufacturing a three-dimensional article comprising:
accreting a layer of selectively fused powder onto an upper surface, the upper surface is one of an upper surface of a build plate and an upper surface of a powder layer, according to the steps of:
  positioning the upper surface proximate to a build plane;
  scanning a powder coater over the upper surface along a scan axis;
  concurrent with scanning, metering a layer of unfused powder onto the upper surface; and
  operating a beam system to selectively fuse the metered layer of powder;
repeat accreting layers of powder above the build plate; and
after accreting N layers, in which N is at least one, remove accumulated powder residue from surfaces of the powder coater according to the steps of:
  positioning the powder coater over a location that is laterally outside of the build plane; and
  operating a vibration generator to shake the accumulated powder from an upper outside surface of the powder coater onto the location outside of the build plane.

10. The method of claim 9, wherein N is at least 2.

11. The method of claim 9, wherein the vibration generator is a motor coupled to an eccentric weight, operating the vibration generator includes spinning the eccentric weight along an axis that is parallel to the scan axis.

12. The method of claim 9, wherein the location outside of the build plane includes an overflow chamber.

13. The method of claim 9, wherein N is at least 10.

14. A three-dimensional printing system for manufacturing a three-dimensional article comprising:
   a build chamber;
   an overflow chamber adjacent to the build chamber;
   a motorized build plate;
   a powder coater including a vibration generator;
   a powder hopper;
   a lateral movement mechanism;
   a beam system; and
   a controller configured to:
   (1) position an upper surface proximate to a build plane, the upper surface is one of an upper surface of a build plate and an upper surface of a previously deposited powder layer;
   (2) operate the lateral movement mechanism to scan the powder coater over the build plane;
   (3) concurrent with scanning, operate the powder coater to meter a layer of unfused powder onto the upper surface;
   (4) operate the beam system to selectively fuse the metered layer of powder;
   (5) repeat (1)-(4) until the three-dimensional article is fabricated;
   (6) replenish the powder coater with powder using the powder hopper after selectively fusing M layers, M is at least one; and
   (7) move the powder coater to the overflow chamber and operate the vibration generator after selectively fusing N layers, N is at least two, operating the vibration generator shakes powder from an upper outside surface of the powder coater and into the overflow chamber.

15. The three-dimensional printing system of claim 14 wherein M equals two.

16. The three-dimensional printing system of claim 14 wherein the powder coater is configured to scan along a scan axis and has a major axis along a transverse axis that is normal to the scan axis, the vibration generator is positioned at one end of the power coater with respect to the transverse axis.

17. The three-dimensional printing system of claim 14 wherein the vibration generator is a motor coupled to an eccentric weight, the motor axis is aligned with the scan axis.

18. The three-dimensional printing system of claim 14, wherein N is at least 10.

* * * * *